(12) United States Patent
Byrne et al.

(10) Patent No.: US 11,722,641 B2
(45) Date of Patent: Aug. 8, 2023

(54) DIGITAL IMAGE INFERENCE SYSTEM WITH ENHANCED PRIVACY PROTECTION

(71) Applicant: Systems & Technology Research, LLC, Woburn, MA (US)

(72) Inventors: Jeffrey Byrne, Lexington, MA (US); Brian DeCann, Boston, MA (US); Scott Harris Bloom, Encinitas, CA (US)

(73) Assignee: SYSTEMS & TECHNOLOGY RESEARCH, LLC, Woburn, MA (US)

( * ) Notice: Subject to any disclaimer, the term of this patent is extended or adjusted under 35 U.S.C. 154(b) by 418 days.

(21) Appl. No.: 17/106,077

(22) Filed: Nov. 28, 2020

(65) Prior Publication Data

US 2021/0203886 A1     Jul. 1, 2021

Related U.S. Application Data

(60) Provisional application No. 62/954,928, filed on Dec. 30, 2019.

(51) Int. Cl.
| | |
|---|---|
| *H04N 7/16* | (2011.01) |
| *H04N 7/167* | (2011.01) |
| *H04N 7/18* | (2006.01) |
| *G06T 5/40* | (2006.01) |
| *G06N 5/04* | (2023.01) |

(52) U.S. Cl.
CPC ............. *H04N 7/1675* (2013.01); *G06N 5/04* (2013.01); *G06T 5/40* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2017/0001104 A1* | 1/2017 | Gross | A63F 13/52 |
| 2019/0236342 A1* | 8/2019 | Madden | G08B 13/19602 |

* cited by examiner

*Primary Examiner* — Cai Y Chen
(74) *Attorney, Agent, or Firm* — Kriegsman & Kriegsman

(57) ABSTRACT

A system for inferring features in a digital image includes a vision sensor for capturing and optically encrypting an image of a visual scene so as to shroud any human-perceivable features contained therein. An image interpreter in communication with the vision sensor is programmed to recognize and classify features in the encrypted image without prior decryption, thereby ensuring the privacy of any subjects depicted therein. The vision sensor is encoded with a calibration key that applies a unique transformation function to optically encrypt the captured image. The image interpreter is permitted access to the calibration key and applies a convolutional network constructed using the calibration key, a source convolutional network, and a set of private layer keys in order to infer features in the encrypted image without prior decryption. For applications requiring enhanced privacy protection, the inference output produced by the image interpreter remains encrypted but available for further feature detection.

19 Claims, 4 Drawing Sheets

DIGITAL IMAGE INFERENCE SYSTEM WITH ENHANCED PRIVACY PROTECTION

CROSS-REFERENCE TO RELATED APPLICATIONS

The present application claims the benefit under 35 U.S.C. 119(e) to U.S. Provisional Patent Application No. 62/954,928, which was filed on Dec. 30, 2019 in the names of Jeffrey Byrne et al., the disclosure of which is incorporated herein by reference.

FEDERALLY SPONSORED RESEARCH OR DEVELOPMENT

This invention was made with government support under contract number HR001119C0067 awarded by the Defense Advanced Research Projects Agency (DARPA)—Defense Services Office (DSO). The government has certain rights in the invention.

FIELD OF THE INVENTION

The present invention relates generally to digital image processing and, more particularly, to systems designed to recognize and classify features in digital images.

BACKGROUND OF THE INVENTION

Vision sensors are well known in the art and typically comprise a camera to capture images within a designated area. In this capacity, vision sensors have a wide range of potential uses including, but not limited to, security monitoring in both commercial and residential environments.

Vision sensors are often specifically designed to perform a forensic video analysis task, such as identifying the presence or accuracy of certain features. Accordingly, vision sensors are commonly manufactured with computational optics and/or in-sensor analog components applied with deep learning algorithms, such as convolutional neural networks, to rapidly detect and identify features of interest within a captured image. For example, a coded aperture vision sensor replaces a camera lens with phase masks realized as diffractive optical elements (DOEs), such that imagery can be recovered using computational photography techniques. As another example, vision sensors are often constructed with angle-sensitive or differential pixels to compute precise motion or angel distribution of the light field.

A convolutional neural network, or ConvNet, is a collection, or framework, of machine learning algorithms that work together to facilitate the recognition and classification of features in digital images based on previous learning and training. As such, convolutional neural networks have numerous diverse applications in deep learning, including industrial vision inspection systems, agricultural monitoring systems, autonomous vehicles, and facial recognition technology.

To reduce an image into its essential features and thereby allow for the detection of features, a ConvNet transforms an input layer to an output layer through a series of hidden layers. The hidden layers include (i) convolutional layers, which apply filters, or kernels, to the input layer using a convolution operation to restrict examination of an image to a limited pixel array and, in turn, detect simple features (e.g., edge, circles, and lines) and/or detailed features (e.g., anatomy, animals, etc.), and (ii) pooling layers, which further reduce the dimensions of the image to facilitate feature detection.

However, it has been found that images captured by vision sensors for feature recognition routinely contain extraneous information about the visible scene that may not be necessary for the target compute vision task. For example, a vision sensor designed for primarily facial recognition not only compiles images of faces present within the field of view but also typically collects images of nearby objects (e.g., in the background). Accordingly, the collection of non-essential imagery within the entire visible scene often introduces a security issue that may potentially violate the privacy of the depicted subjects.

SUMMARY OF THE INVENTION

In view thereof, it is an object of the present invention to provide a novel digital image inference system.

It is another object of the present invention to provide a digital image inference system that is designed to recognize and classify features in digital images.

It is yet another object of the present invention to provide a digital image inference system as described above that preserves the privacy of the depicted subjects.

Accordingly, as one feature of the present invention, there is provided a digital image inference system, comprising (a) a vision sensor adapted to capture an image, the vision sensor encrypting the image in compliance with a calibration key to yield an encrypted image, and (b) an image interpreter in communication with the vision sensor, the image interpreter having access to the calibration key, (c) wherein the image interpreter infers at least one feature in the encrypted image using the calibration key without first decrypting the encrypted image.

As another feature of the present invention, there is provided a method of inferring at least one feature in a digital image, the method comprising the steps of (a) capturing an image using a vision sensor, (b) encrypting the image using the vision sensor to yield an encrypted image, the image being encrypted by the vision sensor in compliance with a calibration key, and (c) inferring at least one feature in the encrypted using an image interpreter in communication with the vision sensor, the image interpreter having access to the calibration key.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Digital Image Inference System 11

Figure 1:
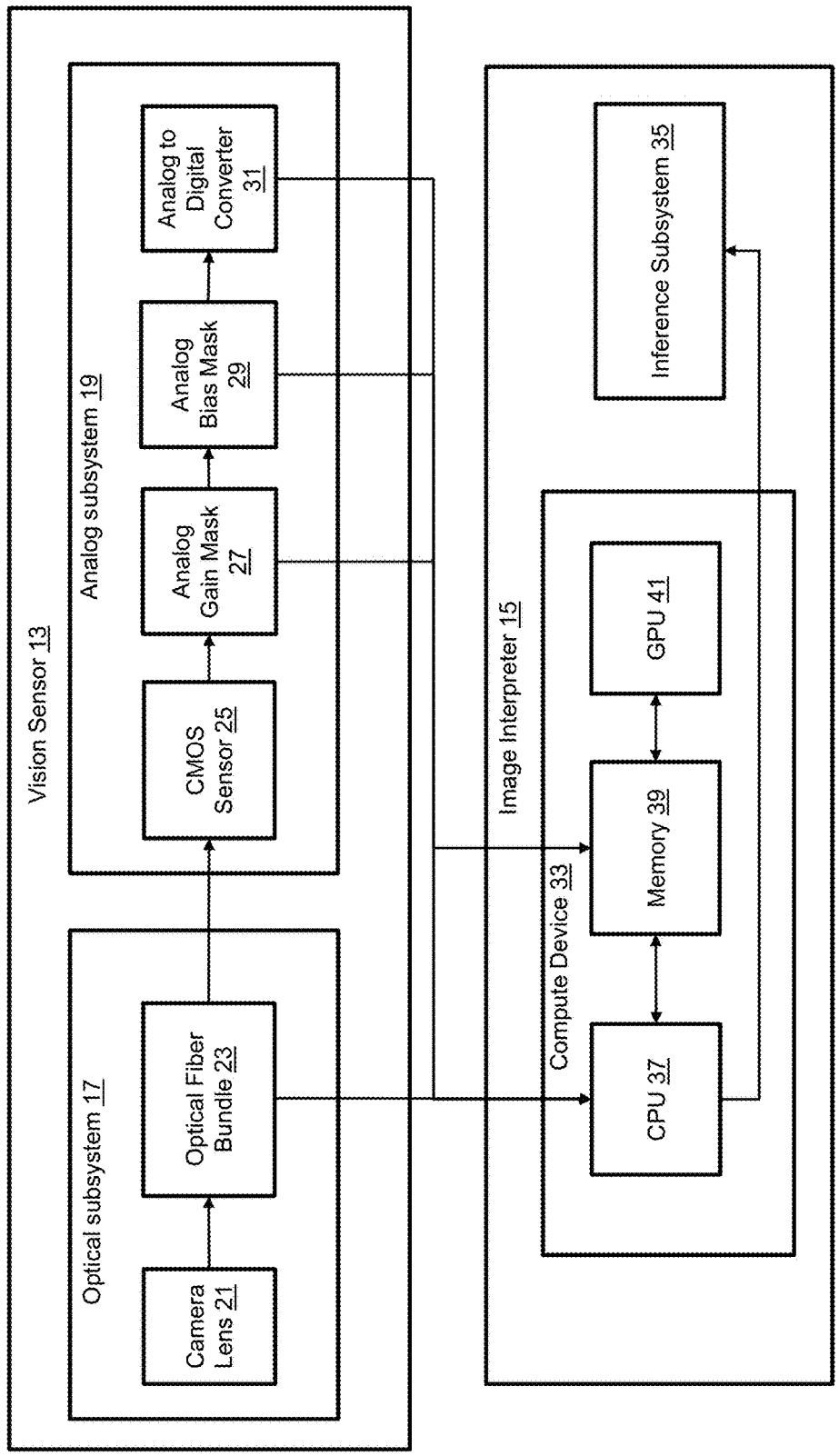
FIG. 1 is a simplified schematic representation of a digital image inference system constructed according to the teachings of the present invention.

Referring now to FIG. 1, there is shown a simplified schematic representation of a digital image inference system constructed according to the teachings of the present invention, the system being identified generally by reference numeral 11. As will be explained in detail below, system 11 is designed to capture an image, optically encrypt the image to shroud any human-perceivable features contained therein, and automatically infer features in the image without prior decryption. In this capacity, system 11 is uniquely designed to detect features in a digital image while preserving the privacy of any sensitive objects (e.g., people) contained therein.

As defined herein, use of the term "digital image" denotes any image captured by an electronic device that can be represented as an array of picture elements, or pixels. For illustrative purposes, digital image is represented principally in the description that follows as a digital photograph. However, it is to be understood that use of the term "digital image" is not limited to digital photographs, but rather, could encompass alternative types of digitally-generated images, such as videos, medical scans and the like, without departing from the spirit of present invention.

As can be seen, system 11 comprises (i) a vision sensor 13 for capturing an sensor measurement, or image, of a visual scene and, in turn, optically encrypting the image so as to disguise, or shroud, human-perceivable features contained therein, and (ii) an image interpreter, or inference engine, 15 in communication with vision sensor 13 for recognizing and classifying features in the encrypted image without any prior decryption. As such, system 11 is constructed as a paired, end-to-end system, or closed network, that engages in the inference of features in a captured digital image without compromising the privacy of any sensitive elements contained therein.

Vision sensor 13 comprises (i) an optical subsystem 17 for capturing and scrambling (i.e. encrypting) an optical image so as to disguise any human-perceivable features therein, and (ii) an analog subsystem for further analog processing the encrypted optical image and, in turn, converting the encrypted analog image into digital form for subsequent feature detection. As will be explained further below, optical subsystem 17 is calibrated, or encoded, with a secret, custom-designed, encryption key that allows for the scrambling of the individual pixels in the optical image in a unique, repeatable configuration. Because image interpreter 15 is in direct communication with optical subsystem 17, interpreter 15 has access to the unique encryption key. Therefore, interpreter 15 can utilize the unique encryption key during the application of feature inference algorithms to detect and classify features in the encrypted optical image without requiring any prior decryption. Furthermore, because access to the unique encryption key is restricted, all sensor measurements remain secure and incapable of any human interpretation.

Optical subsystem 17 comprises a camera lens 21 for focusing light photons within the visible scene to be captured onto an optical fiber bundle 23. By constructing fiber bundle 23 with a large quantity of limited-diameter fibers, light photons within the target scene can be effectively fragmented and transmitted through the individual fibers, with each fiber effectively representing a designated pixel of the captured scene.

Using a unique encryption key customized for optical subsystem 17, fiber bundle 23 implements a mathematical transformation function that scrambles the light field in a known and repeatable manner by shuffling the observed pixels defined by the individual light fibers. The optically shuffled pixels are then transmitted to analog subsystem 19 for subsequent processing.

More specifically, fiber bundle 23 is preferably constructed as a fiber optic faceplate comprised of multiple, micron-diameter, glass fibers that are arranged in parallel and fused together to form a unitary component. Each of the first and second ends of the individual fibers lies in a co-planar relationship. Therefore, fiber bundle 23 forms a thin plate with opposing, polished, pixelated surfaces, with one surface serving as the optical input face and the other surface serving as the optical output face. In the present embodiment, fiber bundle 23 is in the form of an incoherent faceplate, wherein the individual fiber optic strands are shuffled and rotated so that the faceplate will unfaithfully transmit an optical image from its optical input face to its optical output face, but in a deterministic fashion.

It should be noted that fiber bundle 23 need not be limited to the means of manufacture as set forth in detail above. Rather, it is to be understood that fiber bundle 23 could rely on alternative manufacturing techniques to produce a fiber bundle that is designed to transmit an optical image in a defined, scrambled fashion. For instance, fiber bundle 23 could be alternatively manufactured through an optical, three-dimensional printing process using photoresins without departing from the spirit of the present invention.

As a feature of the present invention, fiber bundle 23 is designed to implement a linear transformation matrix to shuffle the individual pixels in a unique, defined configuration. In this manner, optical subsystem 17 is effectively able to both encrypt and decrypt a captured image using the linear transformation matrix. As such, the linear transformation matrix serves as a secret encryption key, which is essential not only to decrypt the image but also to engage in any feature inference.

Optimally, the transformation function utilized for optical encryption satisfies all of the following conditions: (i) the transformation function must be linear, since optical image formation can be modeled as a linear transformation, (ii) the transformation function must be invertible (i.e. lossless), (iii) the transformation function must be non-negative and therefore physically realizable as a linear optical element, (iv) the transformation function must be commutative, thereby enabling inference in optically encrypted convolutional networks with non-linear activation layers, (v) the transformation function must be sparse, thereby ensuring that end-to-end inference in optically encrypted convolutional networks is efficient, and (vi) the transformation function must be closed under the multiplication operator such that repeated application of the transformation function is also a member of the transformation function family.

Accordingly, the present invention preferably utilizes a family of generalized doubly stochastic matrices for the linear transformation matrix, as a family of generalized doubly stochastic matrices satisfies the six requisite conditions set forth in detail above. Whereas a doubly stochastic matrix is a square matrix of non-negative numbers with each row and column summing to one, a generalized doubly stochastic matrix is a square matrix of arbitrary, non-zero, non-negative numbers which does not require each row and column to sum to one.

Analog subsystem 19 comprises a complementary metal oxide semiconductor (CMOS) sensor 25 which receives the optically shuffled pixels of the visible scene. In turn, CMOS sensor 25 converts the pixelized photons into an electrical output signal for subsequent analog encryption and signal processing. Preferably, the analog output signal is applied with (i) a gain mask 27 for, inter alia, applying analog gain to the signal for further encryption purposes, and (ii) a bias mask 29 for, inter alia, applying analog bias to the signal for further encryption purposes. This analog processing serves to implement the pixelwise multiplicative scaling and additive bias that results in a physical realization of the optical transformation.

As referenced above, a family of generalized doubly stochastic matrices is utilized for the encryption of images captured by vision sensor 13. As can be appreciated, a generalized doubly stochastic matrix can be defined as the product, P, of a diagonal matrix (i.e. a square matrix in which all entries outside the main diagonal are zero), D, and a doubly stochastic matrix TT (i.e., P=DU). Constructed as such, it is to be understood that stochastic matrix TT is encoded with pixelwise shuffling or geometric degradation to represent the optical encryption applied by optical subsystem 17, and diagonal matrix D is encoded (via standard affine to linear conversion) with elementwise multiplicative scaling and additive bias or photometric degradation to represent the analog encryption applied by analog subsystem 19.

As noted above, the optical encryption key utilized in the present invention is selected to allow for the construction of an optical transformation convolutional network, which is constructed by selecting doubly stochastic matrix Π as the optical transformation family. More particularly, construction of the optical encryption key is constructed by (i) selecting a pre-trained, source convolutional network function JV that contains only linear and rectified linear unit (ReLU) non-linear layers, and a user-selected privacy parameter a on optical transformation family $F_\alpha$, (ii) randomly selecting a secret image key $A_0$, (iii) randomly selecting secret layer key $A_i \epsilon F_\alpha$, if each layerwise convolutional network function $N_i$ is convolutional, (iv) randomly selecting secret layer key $A_i \epsilon F_{\alpha=1}$, if each layerwise convolutional network function $N_i$ is ReLU, such that secret layer key $A_i$ is restricted to a scaled permutation matrix, (v) selecting embedding key $A_k=1$ for output layer $N_k$ if the inference result is public data, otherwise select embedding key $A_k \epsilon F_\alpha$, if the inference result is private data, and (vi) composing the optical transformation convolutional network M ($A_0 x$; AW $A^{-1}$) from input $A_0 x$ and layerwise parameters AW $A^{-1}$.

Thereafter, the shuffled, scaled, and biased analog output signal is converted into a corresponding digital signal by an analog-to-digital (A-to-D) converter 31. As referenced above, the resultant, encrypted, digital signal can be applied with novel feature detection algorithms by image interpreter 15 without requiring any prior decryption. Therefore, because the digital image remains in its scrambled state throughout the feature detection process, privacy protection is ensured.

Image interpreter 15 is represented herein as comprising a compute device 33 and an auxiliary inference subsystem 35 in direct communication with one another. Compute device 33 is shown comprising (i) a central processing unit (CPU) 37 in communication with both optical subsystem 17 and analog subsystem 19, (ii) memory 39 in communication with A-to-D converter 113 and CPU 37, and (iii) a graphics processing unit (GPU) 41 in communication with memory 39. For enhanced security, it should be noted that system 11 is designed such that the direct communication path between CPU 37 and optical subsystem 17 is established for one-time use in constructing the input layer from the optical encryption key. Thereafter, the communication path established between CPU 37 and optical subsystem 17 is terminated, with CPU 37 remaining in communication only with analog subsystem 19.

As can be appreciated, the encrypted digital signal produced by A-to-D converter 113 is stored in memory 39. Because CPU 37 has access to the unique encryption key utilized by optical fiber bundle 23, compute device 33 is capable of implementing feature inference algorithms on the encrypted signal without prior decryption to yield an inference output, or result. It is to be understood that the encrypted inference process is implemented either by CPU 37 or GPU 41.

Inference subsystem 35 is in communication with compute device 33 and is designed to engage in further processing of the inference result produced by compute device 33. For instance, inference subsystem 35 may maintain one or more training sets, or collections, of pattern filters which are utilized to detect specific image features. In the present embodiment, inference subsystem 35 is represented locally with compute device 33 to form a unitary image interpreter 15. However, it is to be understood that inference subsystem 35 could be separate and remotely located from compute device 33 without departing from the spirit of the present invention.

In the present embodiment, vision sensor 13 and compute device 33 are represented as two separate components in direct communication with one another. However, it is to be understood that system 11 could be alternatively constructed with vision sensor 13 and compute device 33 commonly housed to form an all-in-one, feature inference solution. The inference output from such a system could be coupled to an external inference device (e.g., inference subsystem 35) for further processing. Because all sensor measurements, encryption, signal processing, and feature inference would be undertaken within a single component, enhanced privacy protection is achieved.

Additionally, although not shown herein, it is to be understood that system 11 could be alternatively constructed such that optical encryption is performed by vision sensor 13 after the captured image is converted into digital form by A-to-D converter 31 (i.e., instead of by optical fiber bundle 23). Although less secure, a digitally-based optical encryption process renders vision sensor 13 more flexible in that the optical encryption key utilized by vision sensor 13 could be dynamically modified, or re-keyed, for implementation in certain applications.

Image Encryption and Feature Inference Method
111

As referenced above, system 11 is uniquely designed to engage in a novel method of image encryption and feature inference, the method being identified generally herein with reference numeral 111. As will be explained in detail below, method 111 relies principally upon (i) an optical encryption step in which a pixelated image is captured and subsequently scrambled using a unique encryption key to yield an encrypted digital image, and (ii) a feature inference step in which features are identified in the encrypted digital image without prior decryption through use of a convolution network that incorporates the unique encryption key.

Figure 2:
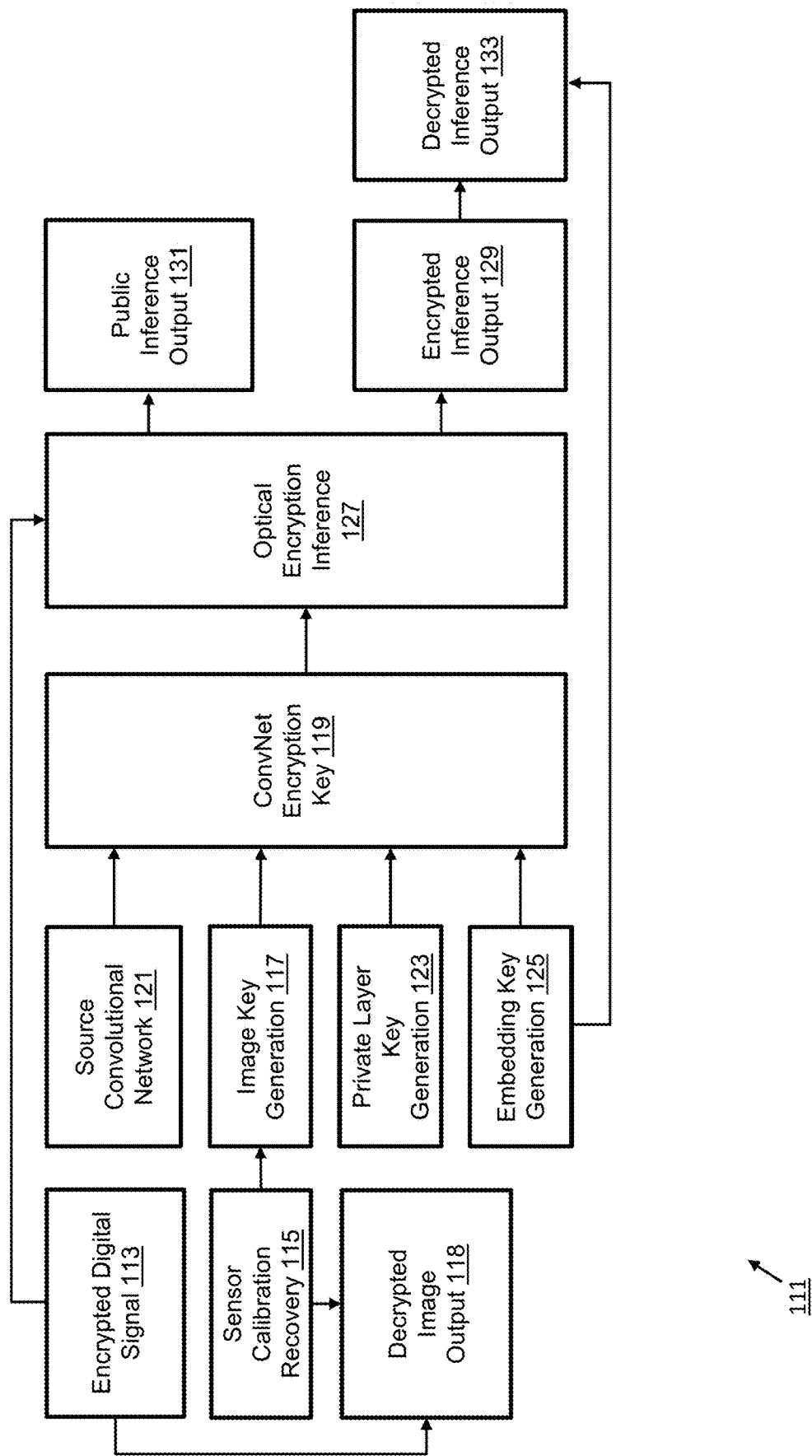
FIG. 2 is simplified flow diagram of a novel image encryption and feature inference method implemented by the system shown in FIG. 1.

Referring now to FIG. 2, there is shown a simplified flow diagram of image encryption and feature inference method 111. As previously noted, vision sensor 13 is encoded to produce a digital image with optical and analog encryption, as represented by step 113. In step 115, vision sensor 13 is calibrated to allow for the recovery the optical and analog transformation encoded as part of its manufacture. As a result of calibration recovery step 115, an image, or calibration, key is generated in step 117. As can be appreciated, the image key generated in step 117 can be used to invert the encrypted digital image generated by vision sensor 13 and, in turn, to recover the raw original image captured by sensor 13 (i.e., the image prior to optical and analog encryption), as represented by step 118. Because the image key generated in step 117 can only be recovered with direct physical access to image sensor 13, unauthorized decryption and recovery of the raw original image is effectively precluded.

A convolutional network, or ConvNet, encryption key is constructed in step 119 to allow for the subsequent inference of features from the encrypted digital signal generated in step 113. The ConvNet encryption keys generated in step 119 are constructed using (i) the image key generated in step 117, (ii) a source convolutional network, which is pretrained for a given machine learning task, as part of step 121, (iii) private layer keys, which are randomly generated, as part of step 123, and (iv) optional private embedding keys, which are randomly generated in step 125.

The ConvNet encryption keys generated in step 119 are then applied to the encrypted digital signal generated in step 113 to yield an inference output, as represented by step 127. The inference output represented in step 127 is utilized to produce an encrypted inference output, as represented by step 129. Optionally, if the raw original image does not contain any potentially sensitive content, a public (i.e. unencrypted) inference output may be generated from the inference output as part of step 131.

The encrypted inference output generated in step 129 can be decrypted using the embedding key generated in step 125 to yield a raw, or decrypted, inference output, as shown in step 133. The raw inference output generated in step 133 can, in turn, be applied with further algorithmic tools for additional feature analysis and categorization.

Detailed Example of Image Encryption and Feature Inference Method 111

Figure 3:
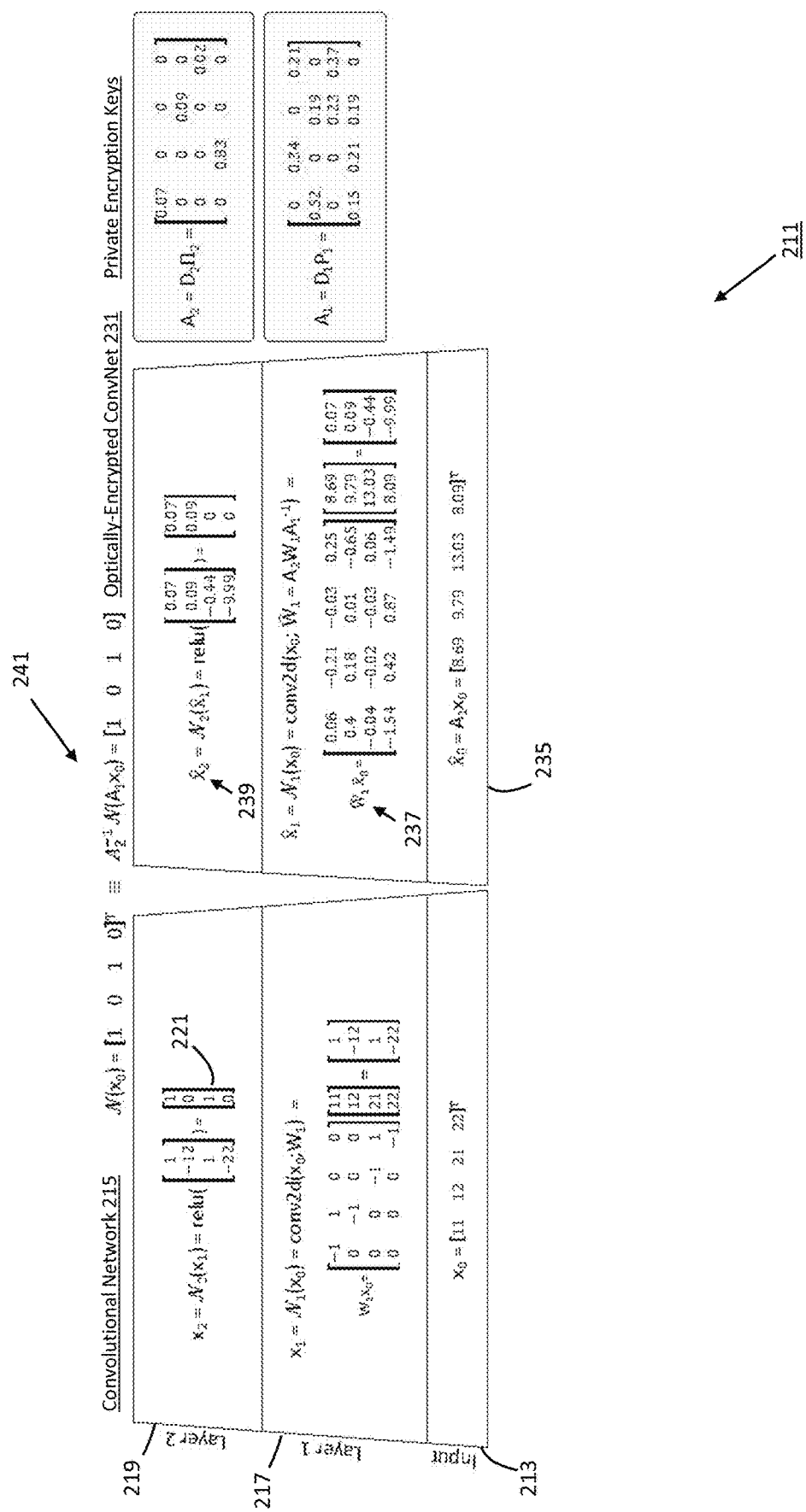
FIG. 3 is a series of mathematical operations which together illustrate the novel image encryption and feature inference method shown in FIG. 2.

Referring now to FIG. 3, there is shown a series of mathematical operations which together illustrate an example of an optical transformation and feature inference process which can be implemented using system 11, the series of operations being identified generally by reference numeral 211. In FIG. 3, a 2×2 raw image is shown vectorized into a 4×1 vector $x_0$, as represented generally by reference numeral 213, and in turn input into a conventional two-level convolutional network 215 comprised of (i) a convolutional layer 217 with kernel [−1,1], or equivalently a Toeplitz matrix $W_1$, and (ii) a rectified linear unit (ReLU) layer 219. The output of convolutional network 215 is a vector $[1,0,1,0]^T$, which is identified generally by reference numeral 221.

By comparison, an optically-encrypted convolutional network 231 constructed according to the teachings of the present invention utilizes private keys $A_1$ and $A_2$ to transform the input and network weights, such that the weights cannot be factored to recover either of private keys $A_1$ and $A_2$ or linear transformation W. As can be appreciated, key $A_1$ is equivalent to a physically realizable optical and analog transformation chain and operates on raw image vector $x_0$ to yield transformed input vector 235. Inference algorithms in network 231 operate similarly to network 215 with transformed weights 237 to produce an encrypted inference output vector 239. This optically-encrypted convolutional network inference output 239 is equivalent to the unencrypted convolutional network inference output 221 by applying the inverse key $A_2^{-1}$, as represented by reference numeral 241. Because inference algorithms can be applied to an optically encrypted vector without prior decryption, network 231 is effectively designed to implement an optical form of homomorphic encryption.

Figure 4:
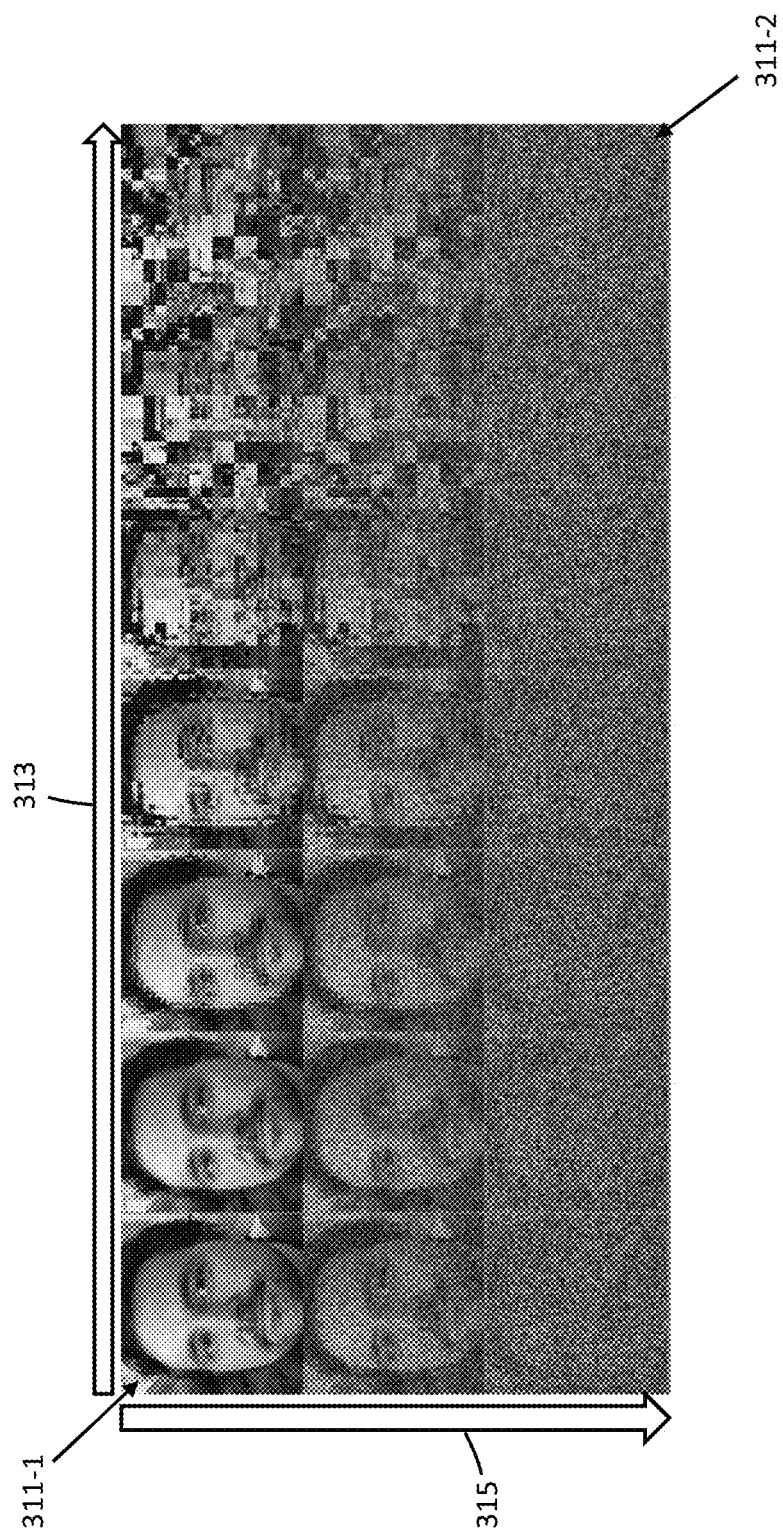
FIG. 4 is an array of sample images generated using the image encryption method shown in FIG. 2.

Referring now to FIG. 4, there is shown various samples of simulated images which have been generated using different types of generalized doubly stochastic matrices as part of an image transformation process applied by vision sensor 13. As can be seen, a raw image 311-1 is represented as being increasingly encrypted through (i) a series of optical transformations, as represented along horizontal scale 313, and (ii) a series of analog transformations, as represented along vertical scale 315. More specifically, horizontal scale 313 shows optical transformations for increasingly random shuffling through the implementation of doubly stochastic matrices in the image transformation process. Vertical scale 315 shows analog transformation for increasingly large gains through the implementation of diagonal matrices in the image transformation process. The combination of the two aforementioned effects results in a transformed image 311-2 that is uninterpretable to a human observer. As illustrated by the various iterations of images between raw image 311-1 and transformed image 311-2, the present invention allows for various partially observable transformations to be used in place thereof, if desired.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A digital image inference system, comprising:
   (a) a vision sensor adapted to capture an image, the vision sensor encrypting the image in compliance with a calibration key to yield an encrypted image; and
   (b) an image interpreter in communication with the vision sensor, the image interpreter having access to the calibration key;
   (c) wherein the image interpreter infers at least one feature in the encrypted image using the calibration key.

2. The digital image inference system as claimed in claim 1 wherein the image interpreter infers at least one feature in the encrypted image without prior decryption.

3. The digital image inference system as claimed in claim 2 wherein the vision sensor applies a linear transformation function to the image to encrypt the image in compliance with the calibration key.

4. The digital image inference system as claimed in claim 3 wherein the image interpreter applies an inverse of the linear transformation function to the encrypted image to infer at least one feature in the encrypted image without prior decryption.

5. The digital image inference system as claimed in claim 4 wherein the transformation function is constructed using a family of generalized doubly stochastic matrices.

6. The system as claimed in claim 3 wherein the image interpreter applies a convolutional network to infer at least one feature in the encrypted image without prior decryption.

7. The digital image inference system as claimed in claim 6 wherein the convolutional network is constructed using the calibration key, a source convolutional network, and a set of private layer keys.

8. The digital image inference system as claimed in claim 7 wherein the image interpreter yields an inference output that is encrypted.

9. The digital image inference system as claimed in claim 3 wherein the vision sensor captures and encrypts the image using the calibration key to yield the encrypted image.

10. The digital image inference system as claimed in claim 9 wherein the vision sensor comprises an optical subsystem for optically encrypting the image in compliance with the calibration key.

11. The digital image inference system as claimed in claim 10 wherein the optical subsystem comprises:
   (a) a camera lens for focusing a collection of light photons; and
   (b) an optical fiber bundle for transmitting the collection of light photons;
   (c) wherein the optical fiber bundle is calibrated to transmit the collection of light photons in a scrambled arrangement in compliance with the calibration key to yield an optically encrypted image.

12. The digital image inference system as claimed in claim 11 wherein the vision sensor comprises an analog subsystem for analog encryption of the optically encrypted image.

13. The digital image inference system as claimed in claim 12 wherein the analog subsystem comprises:
   (a) a sensor for receiving the optically encrypted image and producing a corresponding electrical signal;
   (b) at least one analog mask for applying an analog encryption of the electrical signal to yield an encrypted output signal; and
   (c) an analog-to-digital converter for converting the output signal into an encrypted digital signal.

14. A method of inferring at least one feature in a digital image, the method comprising the steps of:
   (a) capturing an image using a vision sensor;
   (b) encrypting the image using the vision sensor to yield an encrypted image, the image being encrypted by the vision sensor in compliance with a calibration key; and
   (c) inferring at least one feature in the encrypted using an image interpreter in communication with the vision sensor, the image interpreter having access to the calibration key.

15. The digital image inference system as claimed in claim 14 wherein the image interpreter infers at least one feature in the encrypted image without prior decryption.

16. The method as claimed in claim 15 wherein the encryption step includes the application of a linear transformation function to the image to encrypt the image in compliance with the calibration key.

17. The method as claimed in claim 16 wherein the inference step includes the application of an inverse of the linear transformation function to the encrypted image to infer at least one feature in the encrypted image without prior decryption.

18. The method as claimed in claim 16 wherein the linear transformation function is constructed using a family of generalized doubly stochastic matrices.

19. A method of inferring at least one feature in a digital image, the method comprising the steps of:
   (a) capturing an image using a vision sensor;
   (b) encrypting the image through digital simulation of optical and analog transformation functions to yield an encrypted image, the image being encrypted in compliance with a calibration key; and
   (c) inferring at least one feature in the encrypted using an image interpreter in communication with the vision sensor, the image interpreter having access to the calibration key.

* * * * *